April 7, 1936.  D. E. COOLEY  2,036,923
AIRCRAFT
Filed Feb. 2, 1934   5 Sheets-Sheet 1

Dana E. Cooley
INVENTOR
BY Victor J. Evans & Co.
ATTORNEY

WITNESS: R. E. Wise.

April 7, 1936.  D. E. COOLEY  2,036,923
AIRCRAFT
Filed Feb. 2, 1934  5 Sheets-Sheet 2
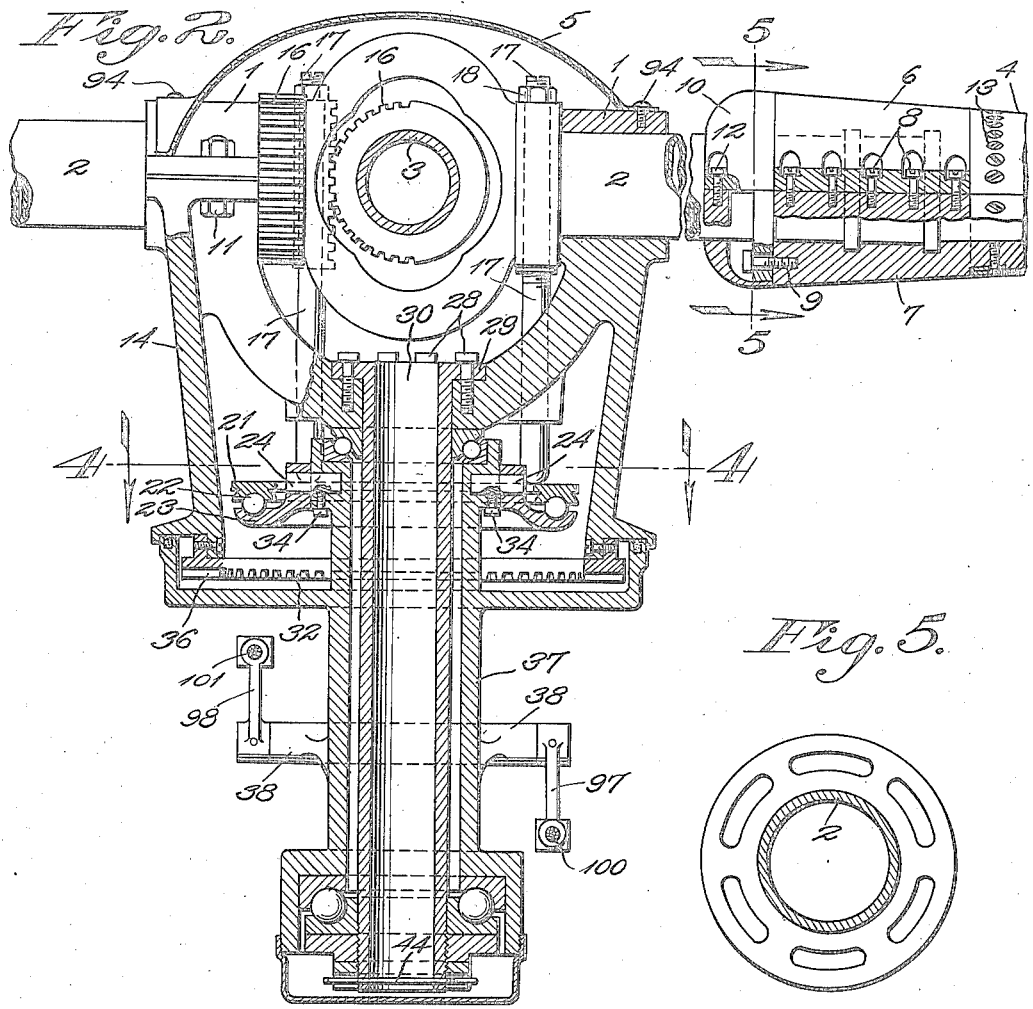
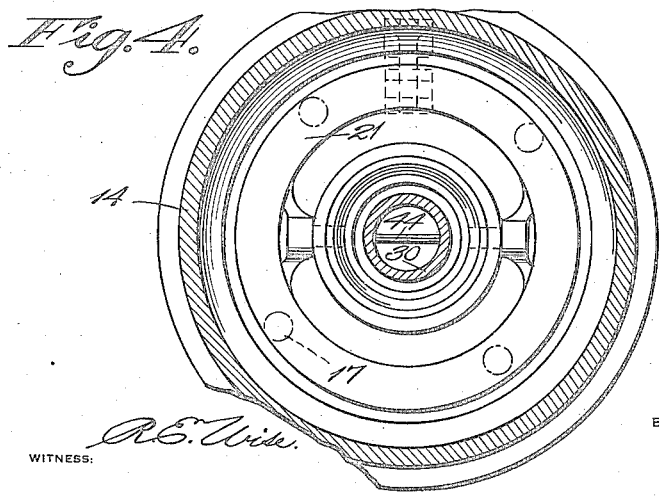
Dana E. Cooley
INVENTOR
BY Victor J. Evans & Co.
ATTORNEY

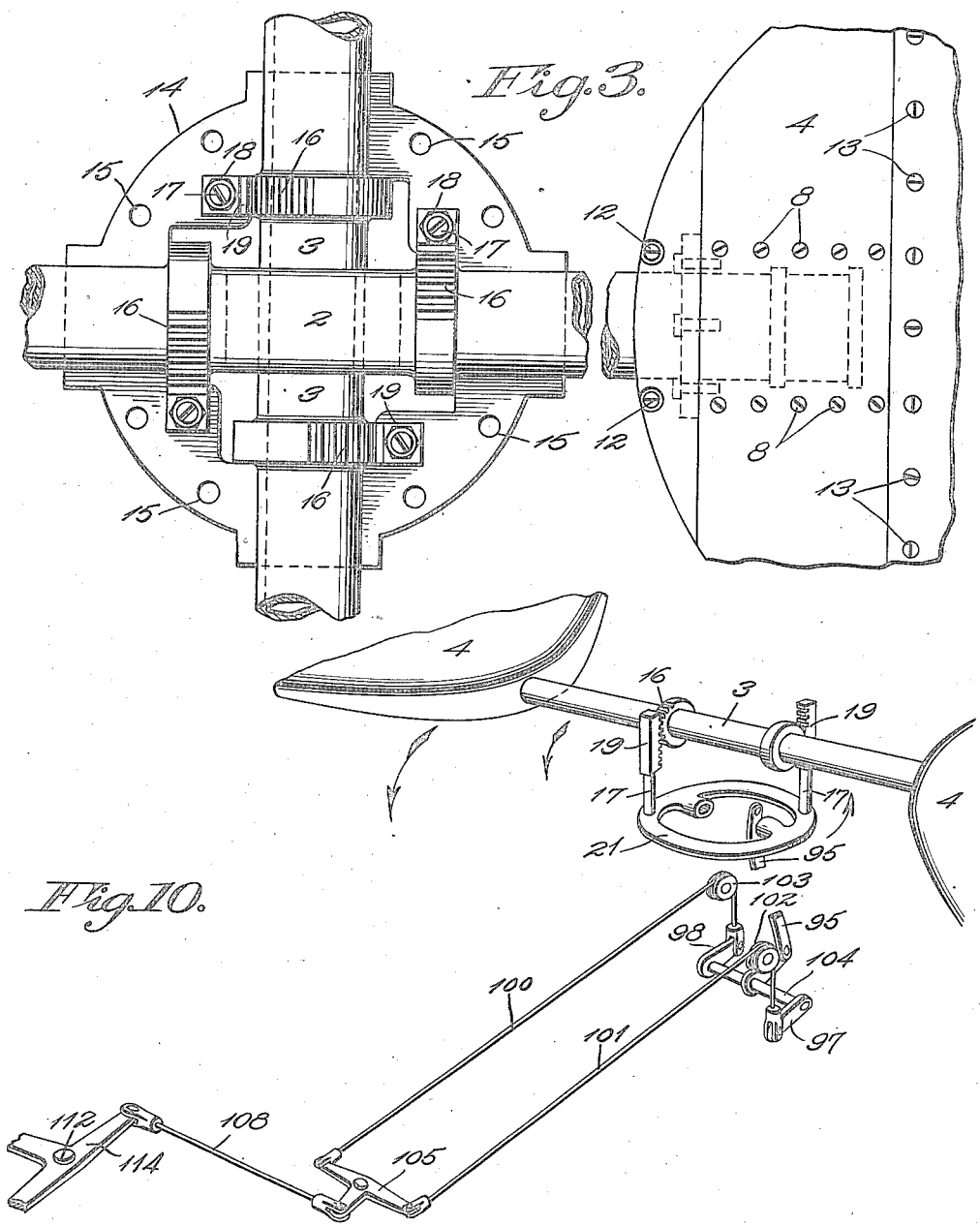

April 7, 1936. D. E. COOLEY 2,036,923
AIRCRAFT
Filed Feb. 2, 1934 5 Sheets-Sheet 4
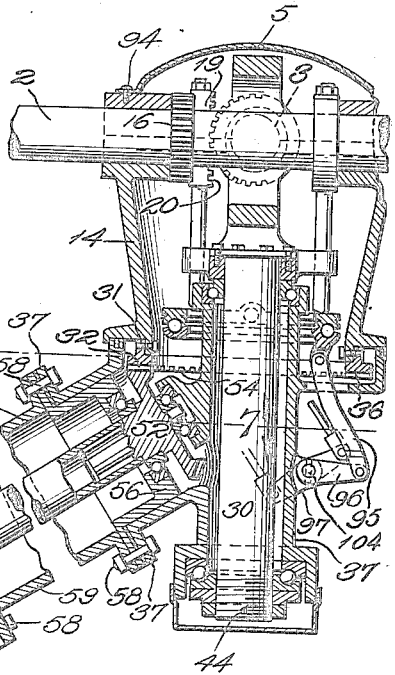
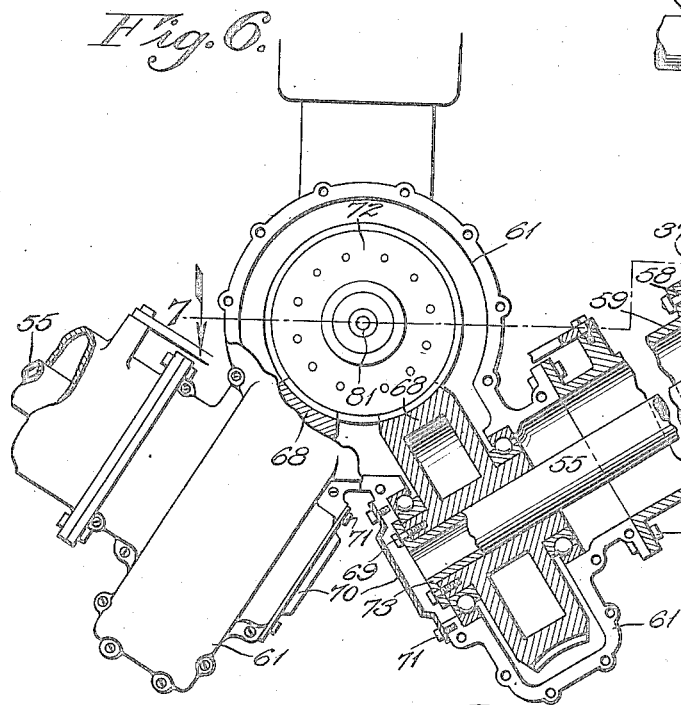
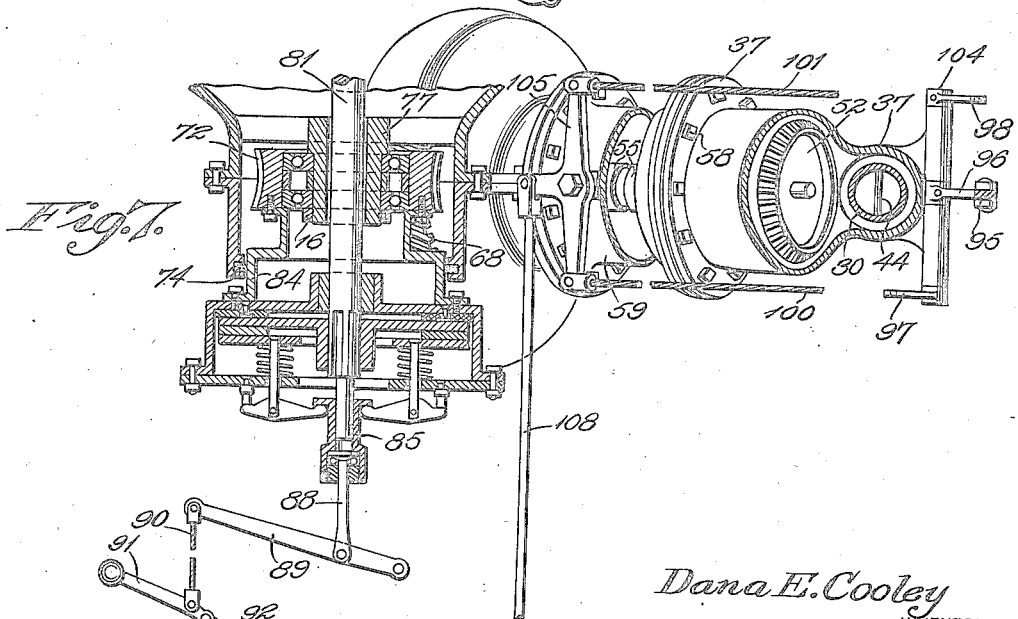
Dana E. Cooley
INVENTOR
BY Victor J. Evans & Co.
ATTORNEY
WITNESS:

April 7, 1936.  D. E. COOLEY  2,036,923
AIRCRAFT
Filed Feb. 2, 1934  5 Sheets-Sheet 5

Dana E. Cooley
INVENTOR

Patented Apr. 7, 1936

2,036,923

UNITED STATES PATENT OFFICE 2,036,923

AIRCRAFT

Dana E. Cooley, Letart, W. Va.

Application February 2, 1934, Serial No. 709,486

1 Claim. (Cl. 244—11)

The invention relates to helicopters and more especially to propellers therefor.

The primary object of the invention is the provision of a propeller of this character, wherein an aircraft can be lifted from the ground without the necessity of the travel of such craft a considerable distance on the ground and also a landing of the craft can be had without it traversing the ground for any considerable distance.

Another object of the invention is the provision of a propeller of this character, wherein the blades can be adjusted and the same variably oscillated for propelling, repelling and balancing an aircraft.

A further object of the invention is the provision of a propeller of this character, wherein the blades thereof are susceptible of being automatically turned so that in successive order these blades will be brought to a feathering position and thereby affording the least resistance when the said blades are in a position for activity in propelling an aircraft or advancing the latter when in flight.

A still further object of the invention is the provision of a propeller of this character, which is comparatively simple in construction, thoroughly reliable and effective in operation, strong, durable and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 2 is a fragmentary vertical sectional view through the hub of the propeller.

Figure 3 is an exploded top plan view of the hub of the propeller as it appears with the bearing cap casting removed.

Figure 4 is a sectional view on the line 4—4 of Figure 2 looking in the direction of the arrows.

Figure 5 is a sectional view through the shaft at the flange to which a blade is attached taken on the line 5—5 of Figure 2.

Figure 6 is a fragmentary sectional view through the driving mechanism by which the power to the propeller is transmitted.

Figure 7 is a fragmentary sectional view through a clutch assembly taken on the line 7—7 of Figure 6 looking in the direction of the arrows.

Figure 10 is a fragmentary perspective view of the mechanism shown in Figures 7 and 8.

Similar reference characters indicate corresponding parts throughout the several views in the drawings.

Figure 1:
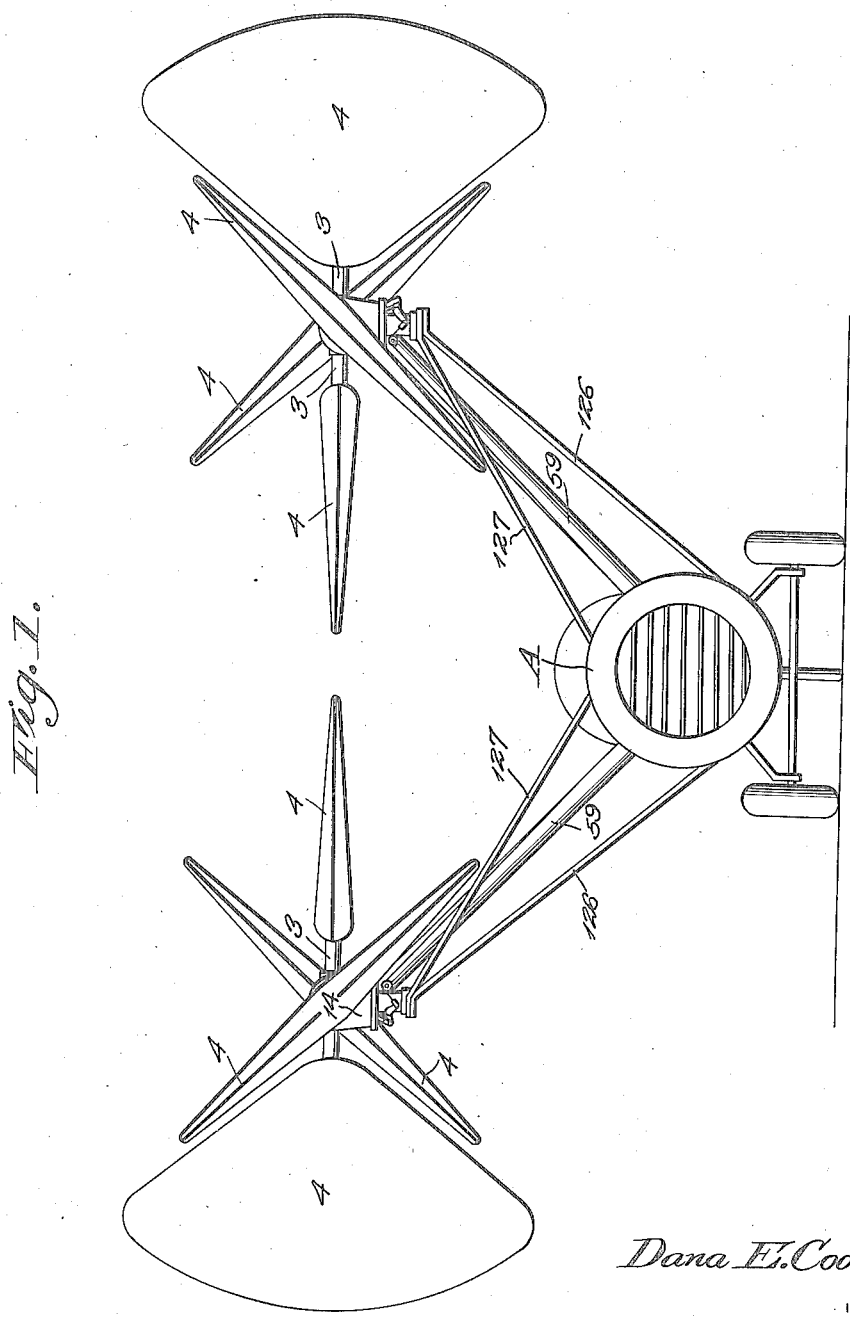
Figure 1 is a front elevation of an aircraft showing propellers constructed in accordance with the invention associated therewith.
Figure 8:
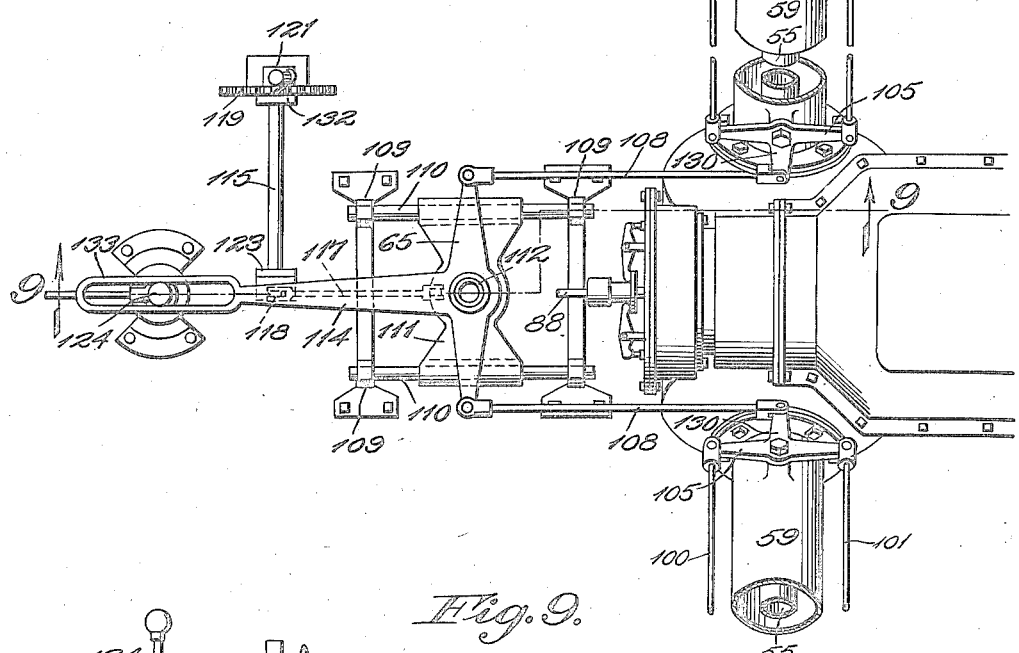
Figure 8 is a fragmentary plan view showing the mechanism by which variable oscillation of the blades of the propeller is effected.
Figure 9:
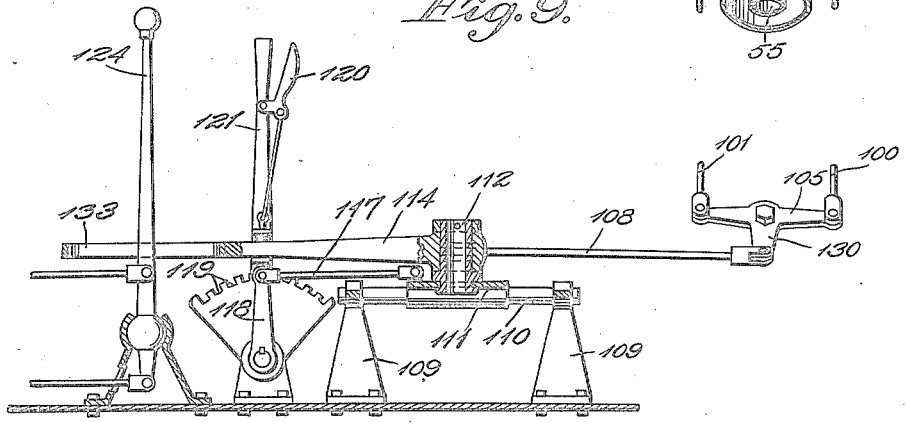
Figure 9 is a side elevation partly in section taken on the line 9—9 of Figure 8 looking in the direction of the arrows.

Referring to the drawings in detail, the aircraft may be powered by any suitable motor of a design for aviation purposes and such motor is preferably to be located in the fuselage A and its crank shaft 81 has one end extended into and connected with a friction clutch, the latter being no part of the present invention, the sleeve 85 serving to release and engage the clutch. This sleeve 85 at one end is machined to receive a pull rod 88 to which is attached a thrust bearing, the other end of the pull rod being connected to a lever 89. This lever 89 has connected thereto a hand lever 91 by the use of a cable 90. When the lever 91 is moved to engage against the stop pin 92 the clutch will be disengaged and will remain so as the line of pull of the cable 90 passes below the axis on which the said lever swings.

A worm 72 revolves around an extension of a housing 61 and is provided with several sets of anti-friction bearing balls in this instance a drum 84 serves to transmit rotation to the worm 72 from the clutch shell. The flange on the drum also serves to retain bearing assembly. There is provided felt packings 74 serving to prevent oil leakage. An extension 77 is provided with threads to receive a nut 76 which is equipped with a set screw and holding the nut in a fixed position.

A worm wheel 68 engages with the worm 72 and is driven thereby. Rotation is transmitted to the teeth of the pinion 54 by means of a drive tube 55 which is secured to the hub of the worm wheel 68, this being had through screws 69 which pass through holes in the flange 73.

A pinion gear 52 is provided with a splined extension from its hub and this extension receives splines of a tube 55. A worm wheel 68 revolves in the housings 61 and 73, these being provided with anti-friction bearings and correspondingly the pinion 52. An inspection cover 70 held in place by the use of screws 71 serves to allow the removal of various parts of the assembly, such as the tube 55, the pinion 52, etc. A tube 59 is provided with flanges at opposite ends, one flanged end is attached to castings 61 and 73 by the use of bolts 58 while the other end is attached to a flange 37 by means of bolts 58. A cup 56 serves to support ball bearings on the under side of the pinion 52 and the teeth 54 of this pinion engage the teeth 32 of a ring gear 36 which is made secure to the hub casting 14 by the screws 31.

The hub 14 is provided with bearings which carry shafts 2 and 3, these having attached thereto the blades 4 by means of clamps 6 and 7, the latter being held secure by the screws 8. Also screws 9 aid in securing the clamps to the shaft, there being elongated holes to allow adjustment of pitch of the said blade. Near the end of the shafts 2 and 3 are rings fitting into grooves, these grooves being in the clamps 6 and 7 and in this manner the clamps are prevented from being slipped off of the shafts.

The screws 13 serve by the aid of the grooves into which the blade metal is folded to secure the same to the clamps 6 and 7. The collars 10 are in halves and clamp the shafts by the use of the screws 12. A casting 1 (Figure 2) forms the upper half of the bearings in which the shafts 2 and 3 oscillate. This casting 1 is secured to a casting 14 by means of bolts 11 which pass through holes meshing with the holes 15—15 in the flange of the casting 14. A cover 5 is held in place by screws 94. The shaft 2 differs from the shaft 3 in that shaft 2 is provided with an eye in the center through which passes the shaft 3. Each shaft is provided with collars forming thrust bearings for said shafts. Teeth 16—16 are cut half way around the outside diameter of each collar on opposite sides thereof, the purpose of which will hereinafter appear.

A tubular spindle 30 (Figure 2) forms the axis of the hub 14 and is provided at the top with a collar 29 through which are drilled holes to accommodate the screws 28—28 which secure the spindle to the casting 14. The spindle in this instance is shown equipped with anti-friction bearings at the top and bottom thereof and also is equipped with a split pin 44. A forging 37 provides a support for the spindle 30 in that it carries bearings therefor, it also carrying pins 24—24 which are retained by set screws 34—34. It is also provided with bosses 38—38 carrying a shaft 104.

In order that the blades of the machine which serve as wings therefor may act as propelling agents and to provide balancing means it is necessary to oscillate them and also to control the extent of oscillation they may be subjected to in flight.

The teeth 16—16 are cut in thrust collars of the shafts 2 and 3 in which the teeth 20 of the rack block 19 engage. Each rack block 19 is drilled from end to end and threaded to receive threads of a push rod 17. At the top of the push rod is a lock nut 18 for retaining adjustment of the same. The push rod 17 rests on the ring 21, the latter at its under side being grooved to form a ball race for balls 22 upon which said ring revolves. A forging 23 is provided with a groove for the balls 22. The forging 23 is also provided with an extension lip on opposite sides thereof to receive the pins 24 and upon which the said forging 23 hangs so that it may be tipped out of level in opposite directions and when so tipped causes the push rods to reciprocate which in turn causes the blades to oscillate as they revolved by means of the rack block and gear teeth 16—16.

To one side of the forging 23 is attached a link 95 which also connects to a lever 96. The oscillating shaft 104 carries three levers 96, 97 and 98, respectively, each of which is secured to the same by keys. To the end of the levers 97 and 98 are attached cables 100 and 101, respectively, these passing over sheaves 102 and 103, respectively, and connect to either end of lever 105.

Mounted on a sliding saddle by means of a hollow pin 112 is a lever 65 to opposite ends of which are connected rods 108—108 which in turn connect to levers 130—130. A saddle 111 is carried by two rods 110—110, these being riveted thereto. The rods are supported by brackets 109—109 at the top of which are bearings through which they may slide. A hand lever 121 connects to the saddle 111 by means of the parts 115, 117 and 118 and this lever is provided with a latch lever 120 serving to lift a latch out of the notches 119 when it is desired to shift the lever to various positions. The shaft 115 is supported at either end by bearings 123 and 132, respectively.

A control lever 124 (similar to those now in common use) passes through a slot 133 provided in the end of the lever 114 and thus it follows that this lever 114 will be effected only when the hand lever 124 is moved to the right or to the left which movements increase the oscillation of one group of the blades while decreasing the oscillation of the other group so that in this way the aircraft is prevented from overturning while in flight.

Struts 126 and 127 aid the tube 59 in supporting the blades of the aircraft in that they connect to the forging 37 by being welded to the same or otherwise joined therewith and also secured to the frame work of the fuselage in a like manner.

The outstanding merits of the present invention lie in the fact that not only do the blades of the machine serve to sustain its weight in flight but propel it as well and additionally produce a repelling action as well as serving to balance the machine.

While it may be possible to lift the machine vertically for flight or lower it to a landing in a like manner, it will not be advisable to do so because of the possibility of machine failure this resulting in a violent landing so for this reason the machine has been designed that it may take off after first making a short run on the ground.

In the event of engine failure while in flight the machine may be brought to a landing and this is accomplished first by releasing the clutch, then the hand lever 121 is moved to an extremely backward position this causing the blades to revolve in opposite direction from that in which they turn when driven by the motor. In this position the blades serve only to support the weight of the machine functioning as ailerons and thus the said machine volplanes to a safe landing as does the more widely known airplane.

The fuselage and the tail of the machine are the same as that used on ordinary planes and included are horizontal and vertical rudders, the design of which being no part of the present invention.

While it has been stated that groups of four blades each are mounted on opposite sides of the fuselage, it being understood, however, that the number of blades either a greater or a lesser number may operate with equal results and the machine may be built to operate with two or more motors and this is contemplated within the scope of the invention.

The forging 23 within the hub 14 by reason of the fact that such forging is susceptible of tilting action therein the wings 4 on the rotation of the hub will be automatically turned so that in successive order these wings will be brought to a feathering position, namely, in a horizontal plane so as to afford the least resistance when the other blades are in a position for activity in propelling the aircraft or on advancing the latter when in flight. This forging 23 when set at an angle remains in this position during the rotation of the hub 14 and by the ring 21 the push rods 17 are acted upon and the rack blocks 19 engaging with the gear formed thrust collar 16 causes the automatic turning of the shaft carrying a pair of the wings 4 which are disposed at right angles to each other and thus by rotation of the hub 14 these wings are turned with the turning of the shaft carrying the same. In other words, the wings are constantly changing their position during the rotation of the hub and this is effected automatically as should be apparent from Figure 10 of the drawings.

What is claimed is:

The combination with a power shaft of driven shafts operated by said power shaft, lever actuated clutch mechanism between the power and driven shafts to control the latter, hubs rotated by said driven shafts, opposed radially disposed wings journaled in said hubs for oscillation, means confined within the hubs and manually adjusted for the automatic changing of the pitch of the wings during the rotation of the hubs, manually operable means for controlling said means, means for rotatably supporting the hubs in a vertical position to have the wings turn automatically in a horizontal plane during rotation of said hubs, means for driving the hubs and means for controlling the driving means.

DANA E. COOLEY.